United States Patent [19]

Bellotto et al.

[11] Patent Number: 4,636,164
[45] Date of Patent: Jan. 13, 1987

[54] MACHINE FOR TRANSFORMING A PIECE OF DOUGH OF GLOBOIDAL FORM INTO A SUBSTANTIALLY CIRCULAR-SHAPED PUFF-PASTRY, WHICH MAY BE PARTICULARLY EMPLOYED FOR PREPARING FOOD-STUFFS OF VARIOUS KINDS

[76] Inventors: Carlo Bellotto, Via Ugo Foscolo, 1 - Cimpello di Fiume Veneto (Pordenone); Antonio Cimenti, Via Baron, 15 - S. Dona' Di Piave (Venezia); Ermes Polo, Via G. F. Carli, 2 - Giais di Aviano (Pordenone), all of Italy

[21] Appl. No.: 705,803

[22] Filed: Feb. 26, 1985

[30] Foreign Application Priority Data

Feb. 27, 1984 [IT] Italy ............................... 45708 A/84

[51] Int. Cl.⁴ .............................. A21C 3/02; B29C 43/46
[52] U.S. Cl. .................................. 425/337; 425/367
[58] Field of Search ............... 425/106, 335, 337, 340, 425/341, 343, 363, 367, 182

[56] References Cited

U.S. PATENT DOCUMENTS

| | | | |
|---|---|---|---|
| 1,763,620 | 6/1930 | Wolfarth et al. | 425/337 |
| 1,871,753 | 8/1932 | Smith | 425/337 |
| 2,707,924 | 5/1955 | Hansen | 425/363 |
| 3,792,948 | 2/1974 | Martinez | 425/337 |
| 3,883,283 | 5/1975 | Herrera | 425/337 |
| 3,999,926 | 12/1976 | Victor | 425/337 |
| 4,375,349 | 3/1983 | Vrbanek | 425/337 |
| 4,403,937 | 9/1983 | Zamparelli et al. | 425/337 |
| 4,576,564 | 3/1986 | Bernardi et al. | 425/337 |

FOREIGN PATENT DOCUMENTS 2354050 6/1978 France .
289367 7/1953 Switzerland .

Primary Examiner—Willard E. Hoag
Attorney, Agent, or Firm—Wenderoth, Lind & Ponack

[57] ABSTRACT

A machine for transforming a piece of dough of globoidal form into a substantially circular puff-pastry includes a feeding duct for receiving the pieces of dough to be worked and bringing them in a first roll train disposed below the duct for flattening the pieces of dough along a first direction and to lodge the same on an inclined plate, thus permitting the so obtained elliptical pre-manufactured doughs to slide down toward a second roll train positioned below the first roll train.

Each pre-manufactured dough which is discharged from the first roll train meets a first oscillating arm which is pivoted at an end portion of a second oscillating arm which in turn is pivoted on the structure of the machine.

The pre-manufactured dough pushes the first oscillating arm downward, while contemporaneously causing the second oscillating arm to be rotated until the pre-manufactured dough is completely released by the first roll train.

4 Claims, 2 Drawing Figures

MACHINE FOR TRANSFORMING A PIECE OF DOUGH OF GLOBOIDAL FORM INTO A SUBSTANTIALLY CIRCULAR-SHAPED PUFF-PASTRY, WHICH MAY BE PARTICULARLY EMPLOYED FOR PREPARING FOOD-STUFFS OF VARIOUS KINDS

BACKGROUND OF THE INVENTION

The present invention relates to a machine for manufacturing puff-pastry of substantially circular form, which may be employed for preparing foodstuffs of various kinds, such as cakes of several types as well as pizzas.

Puff-pastries which are employed for such uses are generally of circular form and are obtained by lamination or flattening of a globoidal small mass of dough, which has been suitably prepared at a previous time, the lamination being obtained either through a manual operation or suitable known machines.

The mechanical manufacturing system is substantially carried out by laminating the pre-manufactured dough along two directions, which are at right angle each other.

The two lamination operations are generally obtained by two roll trains in which are disposed devices to ensure that the two lamination operations are effected along two directions which are orthogonal each other. The devices are able to submit the pre-manufactured dough, which is shaped with a nearly elliptical form at the outlet of the first roll train, to a suitable direction change or a rotation so that the second roll train acts on the dough in a direction which is orthogonal to the direction of the first lamination, so that finally a puff-pastry of substantially circular form may be obtained.

With reference to the system which has been utilized for obtaining the direction change, the pairs of lamination rolls may be disposed reciprocally parallel, or orthogonal or inclined in different manners as well as coplanar or disposed on different planes.

Several solutions have been proposed for obtaining the change in the lamination direction, however these solutions have given rise to various inconveniences and limitations.

For instance, in the machine described in Swiss Pat. No. 289,367 at the outlet of the first roll train the pre-manufactured dough is lodged on a horizontal shelf, from which it is successively manually pushed in to the second roll train, which in turn is arranged in an orthogonal relationship to the first one.

Clearly, the manual intervention requires a careful intervention of the operator and besides it restricts in a considerable manner the performances of the machine. U.S. Pat. No. 1,871,753 describes a machine like the former one, which however should be more efficient since it is provided with a transfer plate which pushes the pre-manufactured dough into the second roll train, wherein such plate is actuated with a reciprocating movement by means of a kinematic motion device which is interconnected to the driving unit of the roll trains.

Besides being mechanically complicated, this solution is also less reliable during operation.

In fact, particularly in the case in which the dough to be manufactured is somewhat soft, at the outlet of the first roll train the pre-manufactured dough may become deformed by the push action which has been produced by the transfer plate, and the pre-manufactured dough even may stick on the horizontal shelf, so that it is completely squashed by the motion of the plate, resulting in the dough being unusable.

U.S. Pat. Nos. 2,707,924; 3,792,948 and 3,883,283 describe solutions which employ elaborate systems, including conveyors which are disposed in different manners, to transfer the pre-manufactured dough from the first to the second roll train.

Clearly, these solutions are considerably complicated, encumbering and expensive.

On the contrary, solutions which are realized in a more simple manner are those described in U.S. Pat. No. 1,763,620 and French Pat. No. 7,617,715, in which at the outlet of the first roll train the pre-manufactured dough is passed over an inclined transfer plane, which is constituted by a fixed plate or a conveyor and during its movement it is subjected to a lateral action by a stopping element which causes the pre-manufactured dough to be rotated around itself. Still being simple, these solutions clearly do not ensure a steady and correct rotation of the pre-manufactured dough, so that the final result is always too approximate, unsteady and uncertain.

Still another simple but more rational solution is described in French Pat. No. 7,507,516, which is similar to the two just previously described. However, in this case rotation of the pre-manufactured dough obtained at the outlet of the first roll train is achieved by the application of a special oscillating device which is constituted either by a tray having two raised orthogonal edges only or by a square having two arms orthogonal each other, which tray or square are pivoted at their relevant angle on the transfer inclined plane and suitably counterweighted.

The pre-manufactured dough which slides over the inclined plane knocks against the transverse element of the tray or square, thus causing the latter to be rotated about its pivot. Consequently, also the premanufactured dough is rotated and inserted into the second roll train.

The tray or the equivalent square, as soon as the pre-manufactured dough has left it, returns in its starting position by the action of a counterweight or an equivalent return means.

An identical solution is also described in Italian patent application No. 83639 A/77.

Finally, Italian patent application No. 83410 A/81 describes a solution which is completely similar to the two last ones, but differs therefrom only in the fact that the two roll trains are not disposed parallel to each other, but rather at angled positions, and that it comprises a means for correcting the path of movement, which means is constituted by a rotating disc which projects from the sliding plane.

In this machine the roll trains are disposed inclined with respect to the horizontal plane, permitting in this manner a pre-manufactured dough obtained from kneadings and which is not soft to be deformed, due to its own weight, so that the final puff-pastry does not have the desired circular form.

The application of the means for correcting the movement path does not overcome such inconvenience nor does it provide any functional improvement, so that this means practically has ever been utilized.

The solution described in French patent No. 7,507,516 and therefore also the following equal solutions which have been described in Italian patent application Nos. 83639 A/77 and 83410 A/81 present remarkable functional inconveniences and limitations.

In fact, since the oscillating device has a fixed rotation point, any weight and/or dimensional change of the pre-manufactured dough causes it to be upset in an anticipated or delayed manner, with consequent imperfect positionings relative to the inlet of the second roll train. In addition, also the upsetting mode thereof may be changed due to several other accidental causes. A certain limited and sole regulation may be obtained by varying either the position of the counterweight acting on the tray, and therefore also the action thereof, or of the equivalent square. However, in practice this regulation is insufficient even in limited cases.

SUMMARY OF THE INVENTION

The object of the present invention is to overcome the inconveniences and limitations of the previously described solutions, and this object is achieved means of the present machine which is structurally simple and inexpensive, has small overall dimensions and a limited weight.

This machine also has a remarkable productive capacity, while being simple and reliable to use, and furthermore it has different regulation possibilities allowing its utilization with remarkable accuracy for manufacturing puff-pastry in a very reliable manner and with a wide range of weights and dimensions thereof.

Basically, the machine of the invention includes a supporting structure on which first and second roll trains are fixed. Each of the first and second roll trains is formed by pairs of rolls which are preferably disposed in a horizontal and reriprocally parallel position. The distance between the rolls of each pair of rolls may be regulated and the rolls are reciprocally interconnected in a kinematic manner and driven in rotation by means of a motor. The first and second roll trains are arranged respectively at the upper end portion and the lower end portion of an inclined plate which slidably supports the premanufactured dough which is discharged from the first roll train and moves towards second roll train. The machine also includes a device which is able to receive the pre-manufactured dough at the outlet of the first roll train and to accompany it in a guided manner, while contemporaneously rotating the dough about itself along the inclined plate. The device then releases the pre-manufactured dough at the inlet of the second roll train, in such a position as the pre-manufactured dough will be submitted to a second lamination operation which is orthogonal to the preceding one.

According to the invention, the present machine is characterized in that such device includes a first oscillating arm, pivoted at an end portion thereof on an end portion of a second oscillating arm whose other end portion is pivoted at a position which is between the first and second roll trains. The first oscillating arm preferably is constituted by a bar skimming the upper surface of the plate, such bar being slidably guided along the plate by the second arm and being movable from a first position, at which it is disposed near the first roll train and transverse to the sliding movement direction of the pre-manufactured dough which is discharged therefrom, to a second position which is determined by the impact of the second oscillating arm against a stopping element, at which the bar is disposed near the second roll train. Due to the push affect of the pre-manufactured dough and the instantaneous stopping of the second oscillating arm, the bar is rotating about its pivot while contemporaneously causing the pre-manufactured dough to be rotated about itself, and then to be released into the second roll train in such a position that the pre-manufactured dough is rotated through an appropriate angle with respect to the direction of the first lamination operation. The machine also includes adjustable return means which bring the first and second oscillating arms back to the respective starting positions, and adjustable stopping means which are able to define the oscillating amplitude of the first and second oscillating arms.

According to another feature, the return means are preferably constituted by counterweights which are disposed on respective third and fourth arms are opposed to the first and second arms, respectively, and which are removably fixable along the respective third and fourth arms. The third and fourth arms are removably connected to the respective first and second arms at the respective rotation pivots thereof, and in this manner may assume different reciprocal angular positions therewith. The regulations which may be so obtained permit wide adjustments of the actions of the counterweights and may be adapted to the different operative requirements of the machine. Another feature of the machine is that the rotation pivot of the first oscillating arm may be removably fixed along the second oscillating arm, and likewise the rotation pivot of the second oscillating arm may be removably fixed in different positions on the structure of the machine, to thereby reciprocally change the rotation positions of the first and second oscillating arms in order to obtain further possible adjustments thereof.

BRIEF DESCRIPTION OF THE DRAWING

The features and advantages of the present machine will be better understood from the following detailed description, by way of example only and not by way of limiting the scope of the invention, of a preferred embodiment of the machine, with reference to the accompanying drawings, in which.

DETAILED DESCRIPTION OF THE DRAWING

Figure 1:
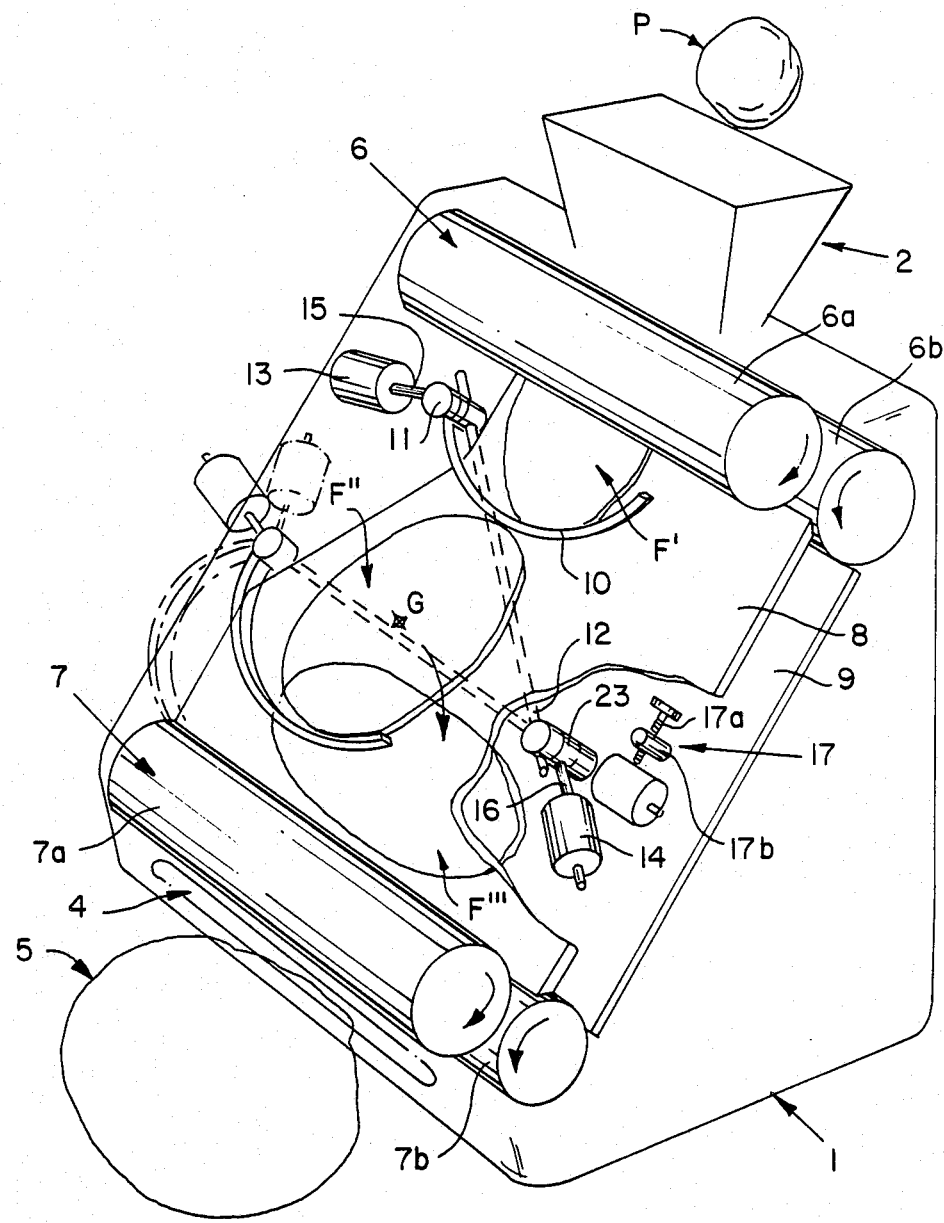
FIG. 1 is a schematic perspective view showing the essential components of the machine according to the present invention.

With particular reference to FIG. 1, a casing or envelope 1 of the machine is indicated with a thin continuous line, which casing includes a duct 2 in its upper side for introducing globoidal dough pieces P therein, which pieces are to be laminated, and also includes an opening 4 in its lower front side for permitting puff-pastry S which is obtained at the end of the operating cycle of the machine, to be discharged therefrom. Inside the casing 1 two roll trains 6 and 7 are provided and supported on a support structure which isn't shown, wherein each of the roll trains is constituted by respective pairs of rolls 6a–6b and 7a–7b, which are reciprocally interconnected in a kinematic manner and driven in a per se known manner by an adequate motor, which also is not illustrated.

The roll trains 6 and 7 are disposed horizontally at a reciprocally parallel position, respectively at the upper end portion and lower end portion of a first inclined plate 8 constituting an inclined plane, forming an angle of about 60° with the horizontal plane, the upper surface of the first inclined plate 8 being appropriately disposed below the lamination openings of the pairs of rolls 6a–6b and 7a–7b. In turn, the first inclined plate 8 is fixed on a second plate 9, at a suitable distance therefrom, which second plate is disposed below the first plate 8 and is integral with the support structure.

A first oscillating arm is disposed on the front surface of the inclined plate 8, wherein the oscillating arm is formed by a bar 10 which is pivoted at one end portion thereof on a pivot 11, which in turn is removably fixed at one end portion of a second oscillating arm, which is constituted by a rod 12 pivoted at the other end portion thereof on a respective pivot 23, which is fixed on the second plate 9. Both the bar 10 and rod 12 are counterweighed by respective counterweights 13 and 14, which are removably fixed on corresponding small rods 15 and 16 which in turn are removably fixed on the respective hinging end portions of the bar 10 and rod 12 and may be contemporaneously rotated about such end portions, so as to form different angles with the corresponding bar 10 and rod 12.

The bar 10 is furthermore curved towards the bottom side, in such a manner that its curvature corresponds at least partially to the outline of the pre-manufactured dough at the outlet of the first roll train, bar 10 also being so arranged to skim the upper surface of the inclined plate 8 and to translate along the latter, guided by the rod 12, which on the contrary is arranged together with the corresponding counterweight 14 in the hollow space which is formed between the first inclined plate 8 and the second plate 9 below it. Finally, the second plate 9 bears an adjustable stopping element 17 which is disposed along the movement path of the counterweight 14, at a position determining the final position of rotation of the second oscillating arm 12.

The adjustable stopping element 17 is constituted by an adjusting screw 17a which is engaged on a pin 17b fixed to the second plate 9. Similar adjustable stopping elements may also be foreseen to determine the other end position of oscillation of the second oscillating arm 12 as well as the two end positions of oscillation of the first oscillating arm 10.

Figure 2:
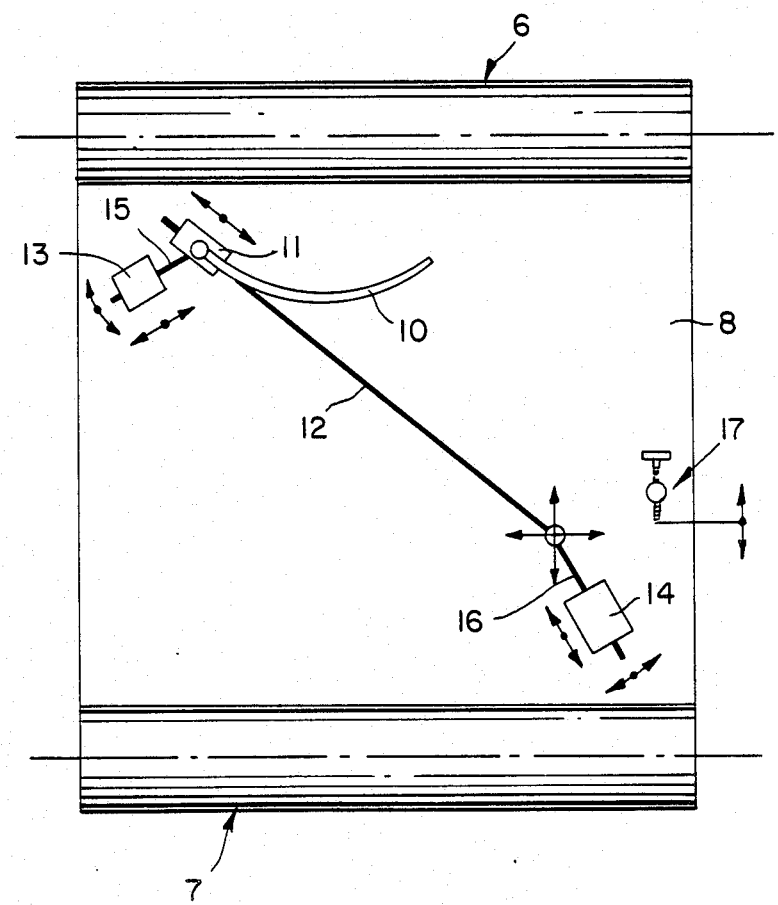
FIG. 2 is a schematic view showing the possible main regulations of the different members of such a machine.

The above described different possible regulation modes are clearly schematically illustrated by arrows in FIG. 2.

The machine operates in the following way:

the globoidal shaped piece of dough P is introduced into the feeding duct 2, which conveys it into the first roll train 6, in which such piece is submitted to a first lamination or flattening operation, transforming the piece of dough P into a pre-manufactured dough having a substantially elliptical form, which is progressively disposed on the inclined plate 8.

The latter supports the pre-manufactured dough while allowing its sliding movement towards the subsequent second roll train 7.

The pre-manufactured dough which is discharged from the first roll train, which dough is indicated by F′ in FIG. 1, meets the bar 10 of the first oscillating arm and progressively pushes it downward, causing simultaneously the rod 12 of the second oscillating arm to be rotated.

Initially, the push on the first oscillating arm 10 is essentially caused by the movement which has been imparted to the pre-manufactured dough F″ during the lamination operation.

Successively, when the pre-manufactured dough has completely been released, the push continues due to the weight of the pre-manufactured dough, so that the latter is continuously shifted downward until the counterweight 14 of the second oscillating arm 12 meets the end portion of the adjusting screw 17a of the adjustable stopping element 17, thus causing the rotation of the second oscillating arm 12 to be immediately stopped. Still considering FIG. 1, the different elements constituting the first and second oscillating arm as well as the pre-manufactured dough, which has been now indicated by F″, are clearly illustrated in this position by thin lines.

The pre-manufactured dough, during its displacement from the outlet of the first roll train 6 to the position in which the second oscillating arm 12 is stopped, is guided by the bar 10 in a laterally shifted position while being at the same time submitted to a partial rotation about itself, so that at last the center of gravity G of the pre-manufactured dough is laterally shifted with respect to its bearing point against the bar 10.

The immediate stopping of the second oscillating arm 12 causes the pre-manufactured dough F″, which due to inertia tends to continue its movement, to produce a push against the bar 10, so determining the rotation of the latter about its pivot 11, as clearly illustrated in FIG. 1 in which the position which has been assumed by the first movable arm (bar 10 and relevant counterweight 13 thereof) at the end of such a rotation is indicated by thin dotted lines.

At the same time, the pre-manufactured dough is induced to rotate ulteriorly around its bearing point against the bar 10, in the direction indicated by the arrow, so shifting from the position F″ to the position F‴, in which it is completely released by the bar 10 and disposed in a position with its larger axis extending substantially parallel to the axis of the rolls 7a and 7b of the second roll train 7 and thus orthogonal to the relative lamination direction thereof.

Successively, the pre-manufactured dough F‴ penetrates into the second roll train 7 in which it is submitted to a second lamination or flattening operation which, due to the fact of being effected in a direction which is orthogonal to the direction of the first lamination operation, causes this pre-manufactured dough to be transversally lengthened (in the direction of the shorter axis), so that at the outlet of the second roll train 7 the pre-manufactured dough assumes the form of a puff-pastry S having a notably circular outline.

The adjustment of the stopping position of the second oscillating arm 12 makes it possible to modify both the position in which the pre-manufactured dough is released and the position in which the same is disposed at the inlet of the second roll train 7. In this manner, it will be possible to obtain an optimal operation even in cases in which the sizes of the pre-manufactured dough are somewhat variable, as well as to change in a notable way the direction of the second lamination operation with respect to the first one, to thus obtain not only puff-pastry provided with a notably circular outline, but also provided with outlines having different forms. From what has been described it appears evident that the machine according to the present invention besides being realized in a constructively simple manner, has the advantages of having a small overall size and being easily usable like some other already known machines, which however all operate in a less flexible manner.

Other advantages of the machine are a remarkable reliability as well as a wide range of modes of utilization. in fact this machine may work in an optimal manner pieces of dough having remarkably variations of weight and kneaded doughs having considerable variations of consistency, particularly resulting from the fact that it is possible to change in an adequate manner the intensity of the action and the arrangement of the means which accompany the pre-manufactured dough during its transfer from the first to the second roll train. In addition, as already specified, the adjustment of the stopping position of the second oscillating arm 12 permits this machine not only to very easily work puff-pastries of different sizes, but also to change in a substantial manner the serial form thereof, by anticipating or delaying the stopping of such second oscillating arm.

It will be understood that the present machine may be submitted to different changes, without departing from to the scope of the present invention.

We claim:

1. A machine for transforming a piece of dough of globoidal form into a substantially circular puff-pastry which may be particularly utilized in the preparation of different foodstuffs, said machine comprising:

a supporting structure on which a first and a second roll train are fixed, each said first and second roll train including pairs of rolls disposed in a horizontal and reciprocally parallel position, wherein the distance between the rolls of each pair of rolls may be regulated and said rolls are reciprocally interconnected in a kinematic manner and driven in rotation by a motor, said first and second roll trains being arranged respectively at an upper end portion and a lower end portion of an inclined plate which slidably supports pre-manufactured dough which is discharged from the first roll train after a first flattening operation thereby towards the second roll train, means for receiving said pre-manufactured dough at an outlet of the first roll train and guiding said pre-manufactured dough while it rotates about itself along said inclined plate and for releasing said pre-manufactured dough at the inlet of said second roll train in a position such that said pre-manufactured dough may be subjected thereby to a second flattening operation which is orthogonal to said first flattening operation, said means comprising a first oscillating arm pivoted at an end portion thereof to a first end portion of a second oscillating arm having a second end portion pivoted at a position between said first and second roll trains, said first oscillating arm comprising a bar skimming the upper surface of said plate and being slidably guided therealong by said second arm, said bar being movable from a first position, at which said bar is disposed near said first roll train and transversally to the direction of sliding movement of the pre-manufactured dough which is discharged therefrom, to a second position which is determined by the impact of said second oscillating arm against an adjustable stopping element, at which said bar is disposed near said second roll train, and at which, due to the push effect of the pre-manufactured dough and the instantaneous stopping of said second oscillating arm, said bar is rotated about its pivot while contemporaneously causing the pre-manufactured dough to be rotated about itself and then to be released into said second roll train in a position such that the pre-manufactured dough will be rotated by an appropriate angle with respect to the direction of the first flattening operation, adjustable return means for bringing said first and second oscillating arms back to the respective starting positions thereof, and adjustable stopping means for limiting the oscillating amplitude of said first and second oscillating arms.

2. A machine according to claim 1, wherein said return means comprise counterweights removably fixable on respective third and fourth arms which are opposite to and removably connected to corresponding said first and second oscillating arms at respective pivots thereof so as to be able to assume different reciprocal angular positions, in such a manner that changes so obtained permit wide adjustment ranges of said counterweights.

3. A machine according to claim 1, wherein the rotational pivot of said first oscillating arm is removably fixable along said second oscillating arm, and the rotational pivot of said second oscillating arm is removably fixable at different positions on said structure of the machine.

4. A machine according to claim 1, wherein said adjustable stopping means of said second oscillating arm are disposed to intercept said second oscillating arm during the rotational movement thereof, said stopping means comprising a screw threaded into a support fixed on said structure of the machine, the screwing or unscrewing of said screw adjusting the release of the pre-manufactured dough into said second roll train, so as to change the form of the puff-pastry which may be obtained.

* * * * *